United States Patent Office 3,146,200
Patented Aug. 25, 1964

3,146,200
STABILIZED GALACTOMANNAN GUM
SOLUTIONS AND PROCESS
Arthur M. Goldstein, Plainview, and Emil N. Alter, Bayside, N.Y., assignors to Stein, Hall & Co., Inc., New York, N.Y., a corporation of New York
No Drawing. Filed Aug. 11, 1960, Ser. No. 48,821
26 Claims. (Cl. 252—8.5)

This invention relates to a process for retarding the rate of degradation of glactomannan materials in the presence of water. In particular, the invention relates to compositions for use in preparing colloidal aqueous solutions of galactomannan materials wherein the galactomannan materials have a reduced rate of degradation at elevated temperatures.

This application is a continuation-in-part of copending application Serial Number 649,612, filed April 1, 1957, now abandoned.

Galactomannan materials are used in the presence of water for a variety of purposes under temperature conditions which, within a very short time, cause a breakdown of the material and a consequent decrease or complete loss of viscosity or other desirable characteristic imparted to the solution by the material. In many instances, the primary reason for employing the galactomannan is to impart and maintain a desirable viscosity. In other instances, the material is employed as a precipitant or flocculant, or is merely maintained in the form of a hot solution or suspension during use. In any event, the instability of galactomannan materials in the presence of water under conditions of relatively high temperatures is a severe disadvantage.

An example of this problem is found where guar gum is used as a thickening agent in asphalt emulsions. These emulsions are often held as long as a week at temperatures ranging from 150 to 200° F. prior to use. Under these conditions, the guar gum rapidly breaks down with a consequent loss of its thickening ability and the emulsion returns to its original viscosity.

Another instance where the stability of guar gum is an important problem is where it is used as a viscosity imparting agent in oil well drilling and in oil well workover fluids. Oil well drilling fluids or drilling muds, as they are sometimes called, are aqueous suspensions or slurries of finely divided solid material, such as clay. The fluid is circulated through the bore hole during the drilling operation to carry cuttings away from the drill bit to the surface, to lubricate the bit, to cool the bit, and to furnish a hydrostatic head to prevent escape of unwanted liquids into the bore hole from liquid-containing strata. Drilling fluids have other specialized functions, such as coating the sides of the bore hole with a thin coating of mud. Similar fluids are used in fracturing operations where preselected strata are rendered more porous to increase the flow of oil therefrom.

Galactomannan gums are used as suspending agents, stabilizers or viscosity regulating agents in drilling fluids. While their use has proved extremely advantageous, high temperature conditions encountered in the bore hole often cause rapid degradation of the galactomannan. In these cases, the effective level of galactomannan must be maintained by frequent addition of the material to the mud. This adds considerably to the expense of the operation.

The galactomannans form colloidal dispersions rather than true solutions in water. These are variously termed aqueous solutions, colloidal aqueous solutions and colloidal dispersions by workers in the field. For convenience, the invention will be described in terms of colloidal aqueous solutions and it will be understood that this term encompasses mixtures of water and galactomannan materials.

It has now been found that colloidal aqueous solutions of galactomannan materials may be stabilized for a considerable period of time under conditions of high temperature by proper regulation of the pH of the medium and by providing for the presence of certain salts.

The salts which are used according to this invention include those from the group consisting of the water-soluble metal sulfites, thiosulfates and arsenites which are effective in retarding degradation of the carbohydrate material in the presence of water at elevated temperatures. Examples of suitable salts include sodium sulfite, zinc sulfite, sodium thiosulfate, magnesium thiosulfate, potassium sulfite, potassium thiosulfate, potassium arsenite, and sodium arsenite. It has been found necessary, in many instances, that sodium chloride be present in order to render the salt from the stated group effective, or to increase the effectiveness thereof.

Certain other inorganic salts have also been found to provide an additive effect when employed with the salts listed above, although when employed alone, they are found to have little or no effect. These include disodium phosphate, trisodium phosphate, and sodium tripolyphosphate. It is thought that these salts exert a buffering or other pH modifying effect favorable to galactomannan stability at elevated temperatures.

The galactomannan materials to which this invention relates are polysaccharides, generally termed hemicelluloses, and are long chain polymers of galactose and mannose units. While their exact composition is not known, they have been found to yield these two sugars on hydrolysis. They are gum-like materials, generally found in plant seeds. Examples of the galactomannans are guar gum, obtained from *Cyamopsis tetragonolobus* (a legume); locust bean gum, obtained from *Ceratonia siliqua*; and tara gum, obtained from *Cesalpinia spinosa*.

As has been mentioned above, the pH of the solution is a critical factor if the desired viscosity or other characteristics of the galactomannan in colloidal aqueous solution is to be maintained over a period of time under high temperature conditions. Generally speaking, at a pH below about 5.5, the solutions are unstable at high temperatures, regardless of whether the salts or combination of salts which may be employed according to this invention are utilized. Above a pH of about 5.5, the galactomannans are favorably influenced by the presence of the salt additives. It is preferred, in the case of guar gum, that a pH of from about 8–10 be utilized.

Not all of the salts of the group listed above function to improve the stability of all of the galactomannan materials to the desired extent. In some instances, a given salt will be more effective than in others. For example, in the case of tara gum, sodium sulfite is extremely effective in retarding degradation at elevated temperatures.

On the other hand, sodium thiosulfate has only a slight effect. It should be noted, however, that sodium thiosulfate in combination with a small amount of disodium phosphate is very effective. On the other hand, sodium sulfite alone has practically no effect on guar gum stability, while sodium thiosulfate slows the rate of degradation of the guar gum considerably.

Another important factor to be considered according to this invention is the presence of sodium chloride. While somewhat effective when used alone, it is generally preferred that sodium chloride be used with one or more of the other salts listed. In most cases, marked improvement is thereby realized over the use of the other salt alone. In the case of sodium sulfite, when used with guar gum for example, the presence of sodium chloride is essential in providing a substantial stabilizing effect. As the sodium chloride concentration is increased in the presence of sodium sulfite, the rate of degradation of the material is decreased.

When using sodium thiosulfate to stabilize guar gum in colloidal aqueous solutions, the presence of sodium chloride is not essential to provide a significant improvement in stability. However, if sodium chloride is used, a decreased rate of degradation is noted, the stability increasing with the sodium chloride concentration.

Although the majority of the salts described above are generally considered to be reducing agents, it is not believed that the results obtained according to this invention are due to this property. Several other inorganic reducing agents including an oxalate, a nitrite, ferrous sulfate, stannous chloride, hydrosulfite, and bisulfite, have been tested and found to be ineffective in reducing the rate of degradation of galactomannans in colloidal aqueous solutions.

The bisulfites, including sodium bisulfite and sulfurous acid, while not useful according to this invention in either water or brine solutions, may be utilized under certain conditions. It is recognized that an increase in the pH of solutions of these compounds will cause formation of sulfites from the bisulfites, and the advantageous use of the sulfites is described above.

Regarding the concentration of salts which may be employed according to this invention, it has been found that 5% sodium thiosulfate, 2.5% sodium sulfite, and 10% zinc sulfite are the minimum concentrations which will provide a desired stability. These levels are based on the weight of galactomannan present. Salt levels substantially lower than these values may prove to be of some benefit, but are generally less than satisfactory. The upper range of concentrations is limited by possible adverse side effects caused by a high concentration of electrolyte in the solution and by the expense of the additive.

It has also been found that certain other compositions, when present in a small amount, lengthen the life of the solution by, in some instances, a few days. For example, disodium phosphate, trisodium phosphate, and sodium tripolyphosphate slightly increase the initial viscosity of the solution and also the stability without obtaining too high a viscosity. These effects are shown in the examples below.

The following specific examples are set forth to more clearly define the processes and products of this invention.

EXAMPLE 1

Guar gum is used as a thickening agent in asphalt emulsions. When used in this capacity, the emulsion may be maintained at a relatively high temperature for long periods of time. It is desirable that the rate of degradation of the guar gum under these conditions be reduced in order to prolong the thickening effect. The tables 1 through 5 below show the improvement in viscosity stability of guar gum solutions held at elevated temperatures for the indicated periods of time. The conditions shown are representative of conditions in heated asphalt emulsions. A high quality edible grade of guar gum was employed and the solutions were prepared at a 1% gum concentration. Unless otherwise specified, all percentage concentrations in the tables are based on the weight of the guar gum in solution with the exception of the sodium chloride, which is based on the weight of the total solution. All solutions were held at the indicated temperature in sealed jars for the indicated periods of time. When tested, the jars were cooled, opened and the viscosity measured by a Brookfield viscosimeter at 25° C. and at 20 r.p.m. Where pH adjustment was required, acid or alkali was added to the solution before any appreciable swelling of the guar gum had taken place.

It should also be noted that in the Tables 1–5 and 7, the "0" time determinations were taken after the gum had been allowed to dissolve in cold water for two hours. In Table 6, the "0" time determinations were obtained on solutions which had been heated at about 100° C. for a time sufficient to dissolve the locust bean gum, and then cooled for two hours prior to determining the viscosity.

Table 1 shows the effect of pH on the guar gum solution in the presence of sodium chloride and sodium sulfite after holding the solution at 80° C. for the periods of time indicated.

*Table 1*

|  | (1) | | (2) | | (3) | | (4) | | (5) | | (6) | | (7) | |
|---|---|---|---|---|---|---|---|---|---|---|---|---|---|---|
| Sodium chloride, percent | 10 | | 10 | | 10 | | 10 | | 10 | | 10 | | | |
| Sodium sulfite, percent | 10 | | 10 | | 10 | | 10 | | 10 | | | | | |
| Initial pH | 3.5 | | 5 | | 6.5 | | 8.5 | | 9.5 | | 8.5 | | 6.5 | |
|  | Visc. | pH | Visc. | pH | Visc. | pH | Visc. | pH | Visc. | pH | Visc. | pH | Visc. | pH |
| Time (days): |  |  |  |  |  |  |  |  |  |  |  |  |  |  |
| 0 |  |  |  |  | 2,300 |  |  |  |  |  | 2,100 |  | 2,300 |  |
| 1 | 10 | 3.4 | 10 | 5.0 | 2,500 | 6.3 | 2,980 | 8.4 | 2,450 | 9.0 | 1,180 | 7.0 | 1,240 | 6.2 |
| 2 |  |  |  |  | 2,500 | 6.5 | 2,810 | 8.6 | 1,900 | 8.7 | 800 | 7.0 | 240 | 5.7 |
| 5 |  |  |  |  | 2,020 | 6.8 | 2,400 | 9.1 | 1,640 | 9.3 |  |  |  |  |
| 9 |  |  |  |  | 1,050 | 7.9 | 2,000 | 9.1 | 1,230 | 9.2 |  |  |  |  |
| 13 |  |  |  |  | 600 | 7.6 | 1,320 | 9.2 | 840 | 9.4 |  |  |  |  |
| 14 |  |  |  |  |  |  | 1,240 | 9.1 |  |  |  |  |  |  |
| 16 |  |  |  |  |  |  | 1,000 | 9.1 |  |  |  |  |  |  |

It can be seen from Table 1 that in the presence of sodium chloride and sodium sulfite, degradation of the guar gum solution is substantially retarded within a pH range of about 6.5 to about 9.5 with a pH of about 8.5 being preferred.

All percentage concentrations in the table are based on the weight of guar gum in solution, with the exception of sodium chloride, which is based on the weight of the total solution. The viscosities were determined with a Brookfield viscosimeter at 25° C. and at 20 r.p.m.

Table 2 illustrates the effectiveness of sodium sulfite in combination with sodium chloride and disodium phosphate in retarding the rate of degradation of a 1% guar gum solution held at 80° C. for the indicated periods of time.

The percent concentration of sodium chloride is by weight of the total solution. All other percents are based on the weight of guar gum in solution. The viscosities were determined with a Brookfield viscosimeter at 25° C. and at 20 r.p.m.

*Table 2*

|  | (1) | | (2) | | (3) | | (4) | | (5) | |
| --- | --- | --- | --- | --- | --- | --- | --- | --- | --- | --- |
| Sodium chloride, percent | 10 | | 10 | | 10 | | 10 | | 10 | |
| Sodium sulfite, percent | | | | | 10 | | 5 | | 5 | |
| Disodium phosphate, precent | | | | | | | 5 | | 4 | |
| Initial pH | 8.5 | | 9.5 | | 8.5 | | 7 | | 5 10 | |
|  | Visc. | pH | Visc. | pH | Visc. | pH | Visc. | pH | Visc. | pH |
| Time (days): | | | | | | | | | | |
| 0 | | | | | 2,260 | | | | 1,500 | |
| 1 | 1,180 | 7.0 | 2,080 | 7.9 | 2,980 | 8.4 | 2,900 | 6.8 | 2,730 | 8.1 |
| 2 | 800 | 7.0 | 1,930 | 8.7 | 2,810 | 8.6 | 1,180 | 7.2 | 2,680 | 9.1 |
| 5 | | | 1,110 | 9.0 | 2,400 | 9.1 | 1,850 | 8.6 | 2,660 | 9.3 |
| 6 | | | 990 | 9.0 | 2,260 | 9.1 | 1,700 | 8.5 | 2,620 | 9.4 |
| 9 | | | | | 2,000 | 9.1 | 1,260 | 8.1 | 2,040 | 9.2 |
| 12 | | | | | 1,460 | 9.1 | 820 | 7.9 | 1,580 | 9.1 |
| 13 | | | | | 1,320 | 9.2 | 640 | 7.7 | 1,500 | 9.1 |
| 14 | | | | | 1,240 | 9.1 | | | 1,500 | 9.0 |
| 16 | | | | | 1,000 | 9.1 | | | 1,280 | 9.0 |

Table 3 illustrates the effectiveness of sodium thiosulfate, both alone at various levels, and in combination with sodium chloride and other additives in stabilizing a 1% guar gum solution at 80° C.

*Table 4*

|  | (1) | | (2) | | (3) | |
| --- | --- | --- | --- | --- | --- | --- |
| Sodium chloride, percent | | | 10 | | 10 | |
| Sodium arsenite, percent | | | 10 | | | |
| Zinc sulfite, percent | | | | | 10 | |
| Initial pH | | | | | 8.5 | |
|  | Visc. | pH | Visc. | pH | Visc. | pH |
| Time (days): | | | | | | |
| 0 | 2,400 | | | | 2,520 | |
| 1 | 1,240 | 6.2 | 2,960 | 9.1 | 2,760 | 7.5 |
| 2 | 240 | 5.7 | | | | |
| 4 | | | | | 2,000 | 7.5 |
| 5 | | | 2,750 | 9.0 | 1,640 | 7.5 |
| 6 | | | 2,680 | 9.0 | 1,350 | 7.5 |
| 8 | | | 2,450 | 9.0 | 650 | 7.2 |
| 11 | | | 1,160 | 9.0 | | |
| 13 | | | 1,860 | 9.0 | | |
| 15 | | | 1,540 | 9.0 | | |
| 19 | | | 1,000 | 8.8 | | |

All percentage concentrations are expressed as percent by weight of the guar gum in solution, with the exception of sodium chloride, which is expressed on the total weight

*Table 3*
[At pH 10]

|  | (1) | | (2) | | (3) | | (4) | | (5) | | (6) | | (7) | |
| --- | --- | --- | --- | --- | --- | --- | --- | --- | --- | --- | --- | --- | --- | --- |
| Sodium chloride, percent | | | 10 | | 10 | | 10 | | 10 | | 10 | | 10 | |
| Sodium thiosulfate, percent | 10 | | 10 | | 10 | | 5 | | 5 | | 5 | | 5 | |
| Sodium tripolyphosphate, percent | | | | | | | | | 5 | | | | | |
| Trisodium phosphate, percent | | | | | | | | | | | 5 | | | |
| Disodium phosphate, percent | | | | | | | | | | | | | 5 | |
|  | Visc. | pH | Visc. | pH | Visc. | pH | Visc. | pH | Visc. | pH | Visc. | pH | Visc. | pH |
| Time (days): | | | | | | | | | | | | | | |
| 0 | | | | | 2,140 | | | | | | | | | |
| 1 | 3,510 | 6.8 | 3,050 | 6.7 | 3,120 | 7.1 | 3,050 | 6.5 | 3,160 | 6.6 | 3,160 | 7.1 | 3,200 | 6.7 |
| 2 | 3,080 | 7.3 | 2,630 | 8.2 | | | 2,740 | 6.8 | 2,930 | 6.5 | 2,960 | 8.5 | 2,960 | 6.7 |
| 5 | | | | | 2,740 | 8.9 | 1,940 | 8.8 | | | | | 1,740 | 7.5 |
| 6 | 1,440 | 6.9 | | | 2,600 | 9.0 | | | 1,540 | 7.7 | 2,480 | .89 | 1,560 | 7.8 |
| 7 | 1,040 | 6.7 | 2,050 | 8.7 | 2,530 | 9.0 | | | 1,400 | 7.6 | 2,550 | 8.9 | 1,400 | 8.1 |
| 9 | | | 1,740 | 8.6 | | | | | 1,140 | 7.5 | 2,340 | 8.5 | 860 | 8.0 |
| 10 | | | 1,580 | 8.3 | | | | | 940 | 7.2 | 2,300 | 8.3 | | |
| 11 | | | 1,480 | 8.1 | 2,200 | 8.9 | | | | | | | | |
| 14 | | | 1,270 | 7.6 | 1,740 | 8.8 | | | | | 1,900 | 8.3 | | |
| 16 | | | 1,090 | 8.2 | | | | | | | 1,280 | 8.0 | | |
| 17 | | | 860 | 7.8 | | | | | | | 1,180 | 8.2 | | |
| 19 | | | | | 1,300 | 8.6 | | | | | | | | |
| 20 | | | | | 1,130 | 8.5 | | | | | 1,010 | 8.2 | | |

Table 4 shows the effectiveness of sodium arsenite and zinc sulfite in retarding the degradation of a 1% guar gum solution held at 80° C. for the periods of time indicated.

of the solution. The viscosity values were determined with a Brookfield viscosimeter at 25° C. and at 20 r.p.m.

Table 5 shows the effectiveness of sodium sulfite in retarding the degradation of 1% guar gum in aqueous solution held at 121° C. for the periods of time indicated.

Table 5

|  | (1) | | (2) | | (3) | | (4) | | (5) | |
|---|---|---|---|---|---|---|---|---|---|---|
| Sodium chloride, percent | 10 | | 30 | | 10 | | 10 | | 30 | |
| Trisodium phosphate, percent | | | | | | | 10 | | 25 | |
| Disodium phosphate, percent | | | | | 100 | | | | | |
| Sodium sulfite, percent | 10 | | 10 | | 10 | | 10 | | 10 | |
| Initial pH | | | 9.5 | | 8.2 | | 9.7 | | 9.3 | |
|  | Visc. | pH | Visc. | pH | Visc. | pH | Visc. | pH | Visc. | pH |
| Time (days): | | | | | | | | | | |
| 0 | | | 1,700 | | 2,300 | | | | | |
| 1 | 5 | 5.8 | 1,350 | 6.8 | 2,450 | 7.9 | 2,400 | 7.4 | 2,900 | 8.7 |
| 2 | | | 100 | | 1,950 | 7.7 | 1,700 | 7.3 | 2,910 | 8.65 |
| 3 | | | | | 1,350 | 7.7 | 1,100 | 7.3 | 2,500 | 8.5 |
| 4 | | | | | 950 | 7.7 | | | | |
| 6 | | | | | | | 800 | 7.3 | | |
| 7 | | | | | 160 | 7.6 | | | 2,080 | 8.3 |

The percent concentration of sodium chloride is based on the total solution. All others are based on the weight of guar gum in solution. Viscosities were determined on a Brookfield viscosimeter at 25° C. and at 20 r.p.m.

It will be noted from the above that the use of sodium sulfite in combination with sodium chloride is not sufficient to impart a substantial stability to the solution at this temperature. The addition of disodium phosphate, or trisodium phosphate, results in considerable improvement.

EXAMPLE 2

The following series of tables illustrates the effectiveness of the various indicated salts in reducing the rate of degradation of locust bean gum and tara gum solutions in the presence of water at elevated temperatures.

Table 6 shows the stabilizing effect of sodium sulfite and sodium thiosulfate in combination with sodium chloride and trisodium phosphate in an aqueous solution of locust bean gum held at 100° C. for the indicated periods of time.

Table 6

|  | (1) | | (2) | | (3) | | (4) | | (5) | | (6) | | (7) | |
|---|---|---|---|---|---|---|---|---|---|---|---|---|---|---|
| Locust bean gum (high grade), percent | 1 | | 1 | | 1 | | 1 | | 1 | | 1 | | 1 | |
| Sodium sulfite, percent | | | 10 | | 10 | | | | | | | | | |
| Sodium thiosulfate, percent | | | | | | | 10 | | 10 | | 10 | | 10 | |
| Sodium chloride, percent | | | | | 10 | | | | | | 10 | | 10 | |
| Trisodium phosphate, percent | | | 0.25 | | | | | | 0.25 | | | | 0.25 | |
|  | Visc. | pH | Visc. | pH | Visc. | pH | Visc. | pH | Visc. | pH | Visc. | pH | Visc. | pH |
| Time (days): | | | | | | | | | | | | | | |
| 0 | 2,500 | | | | 1,860 | | | | | | | | | |
| 2 | 310 | | 145 | | 1,820 | | 1,070 | | 260 | | 740 | | 1,180 | |
| 3 | 136 | 6.3 | 164 | | 1,390 | | 980 | | 430 | | 680 | | 1,130 | |
| 6 | 80 | 8.5 | 266 | 10.2 | 1,320 | 8.3 | 950 | 8.7 | 400 | 9.8 | 580 | 9.1 | 890 | 9.8 |
| 9 | | | | | 800 | 9.4 | | | | | 580 | 9.2 | 780 | 8.6 |

The concentrations of the locust bean gum, sodium chloride and trisodium phosphate are based on the total solution. The concentrations of all other materials are based on the locust bean gum. Viscosities were determined with a Brookfield viscosimeter at 25° C. and at 20 r.p.m.

Table 7 shows the benefits of using sodium sulfite, sodium thiosulfate, sodium chloride and trisodium phosphate with a solution of technical grade of tara gum held at 100° C. for the times indicated.

Table 7

|  | (1) | | (2) | | (3) | | (4) | | (5) | | (6) | | (7) | | (8) | |
|---|---|---|---|---|---|---|---|---|---|---|---|---|---|---|---|---|
| Tara gum, percent (technical) | 3 | | 3 | | 3 | | 3 | | 3 | | 3 | | 3 | | 3 | |
| Sodium sulfite, percent | | | 10 | | 10 | | 10 | | 10 | | | | | | | |
| Sodium thiosulfate, percent | | | | | | | | | | | 10 | | 10 | | 10 | |
| Sodium chloride, percent | | | | | | | 10 | | 10 | | | | | | 10 | |
| Trisodium phosphate, percent | | | | | 0.25 | | | | 0.25 | | | | 0.25 | | 0.25 | |
|  | Visc. | pH | Visc. | pH | Visc. | pH | Visc. | pH | Visc. | pH | Visc. | pH | Visc. | pH | Visc. | pH |
| Time (days): | | | | | | | | | | | | | | | | |
| 0 | 6,700 | | | | 6,800 | | | | | | | | | | 8,480 | |
| 1 | | | 10,000 | | 10,800 | | | | | | | | 11,360 | | 7,200 | |
| 2 | 148 | | 9,060 | | 11,750 | | 6,570 | | 10,000 | | 172 | | 7,750 | | 1,370 | |
| 3 | 46 | 4.7 | 7,080 | | 7,400 | 7.7 | 5,700 | | 1,910 | | 46 | | 5,200 | 6.4 | 610 | |
| 6 | | | 3,280 | 6.5 | 3,980 | 7.8 | 1,760 | 6.2 | 1,720 | 7.5 | 24 | 5.2 | 300 | 6.6 | | |
| 9 | | | | | | | 580 | 7.0 | 730 | 6.1 | | | | | | |

The concentrations of the tara gum, sodium chloride and trisodium phosphate are based on the total solution. The concentrations of all other materials are based on the tara gum. Viscosities were determined with a Brookfield viscosimeter at 25° C. and at 20 r.p.m.

and viscosity. The results of these experiments are given below.

The brine used in this experiment contained 79% tap water, 1% calcium chloride and 20% sodium chloride. Calcium carbonate was added to this solution at a level of one pound per barrel, i.e., about 0.3%.

*Table 8*

A COMPARISON OF THE EFFECTIVENESS OF VARIOUS SALTS IN THE PROMOTION OF HEAT STABILITY OF GUAR GUM SUSPENSIONS

|  | 2 hr. hydration at 77° F. | | 24 hr. hydration at 150° F. | | 48 hr. hydration at 150° F. | | 72 hr. hydration at 150° F. | | 144 hr. hydration at 150° F. | | 168 hr. hydration at 150° F. | |
|---|---|---|---|---|---|---|---|---|---|---|---|---|
|  | pH | Visc., cps. | pH | Visc., cps. | pH | Visc., cps. | pH | Visc., cps. | pH | Visc., cps. | pH | Visc., cps. |
| 0.9% Guar: | | | | | | | | | | | | |
| Brine | 7.3 | 1,730 | 6.6 | 170 | 6.7 | 126 | 6.95 | 84 | 7.15 | 48 | 7.2 | 48 |
| Tap water | 5.8 | 2,040 | 5.5 | 409 | 5.7 | 234 | 6.0 | 134 | 6.8 | 42 | 5.6 | 38 |
| 0.9% Guar+0.1% $Na_2S_2O_3$: | | | | | | | | | | | | |
| Brine | 7.9 | 840 | 7.0 | 2,480 | 6.8 | 2,180 | 7.1 | 1,640 | 7.9 | 1,040 | 7.25 | 1,000 |
| Tap water | 5.6 | 1,880 | 6.1 | 800 | 6.3 | 280 | | | 6.5 | 46 | | |
| 0.9% Guar+0.1% $MgS_2O_3$: | | | | | | | | | | | | |
| Brine | 7.2 | 2,050 | 6.9 | 2,530 | 6.8 | 2,300 | 6.85 | 2,090 | 7.25 | 1,390 | 7.1 | 1,440 |
| Tap water | 5.4 | 1,630 | 6.25 | 1,750 | 5.5 | 960 | 6.1 | 400 | 6.0 | 72 | 7.1 | 52 |
| 0.9% Guar+0.1% $K_2SO_3$: | | | | | | | | | | | | |
| Brine | 7.5 | 1,500 | 7.0 | 2,380 | 6.3 | 2,100 | 6.85 | 2,090 | 7.5 | 1,420 | 7.3 | 1,240 |
| Tap water | 5.7 | 920 | 6.4 | 950 | 5.7 | 48 | 5.6 | 26 | 6.05 | 16 | 6.5 | 18 |
| 0.9% Guar+0.1% $KAsO_2$:* | | | | | | | | | | | | |
| Brine | 9.3-7.5 | 136 | | | | | | | | | | |
| Tap water | 9.65 | 1,816 | 9.2 | 2,340 | 9.25 | 1,670 | 9.25 | 1,500 | 9.0 | 1,150 | 8.9 | 860 |
| 0.9% Guar+0.1% $K_2S_2O_3$: | | | | | | | | | | | | |
| Brine | 7.3 | 1,510 | 7.1 | 2,620 | 6.9 | 2,420 | 7.1 | 1,825 | 7.3 | 430 | 7.35 | 230 |
| Tap water | 7.9 | 1,460 | 7.7 | 48 | 7.3 | 13 | | | 5.3 | 12 | | |

*Initial pH 9.3, therefore, adjusted to 7.5 with HCl; however, inhibition too great, therefore, discarded.

EXAMPLE 3

Compositions for use as additives to oil well drilling fluid were prepared having the following formulae:

|  | 1 | 2 |
|---|---|---|
|  | Percent | Percent |
| Sodium thiosulfate | 5.0 | 5.0 |
| Guar gum | 94.9 | 94.1 |
| Phenyl mercuric acetate (preservative) | 0.1 | |
| Sodium pentachlorophenate (preservative) | | 0.9 |

The above compositions are used as viscosity improving additives for oil well drilling fluids. They are employed in fluids having a pH in the range of from about 8 to about 10 and are used at a level ranging from about 0.25% to about 7.5% based on the total weight of the drilling fluid.

EXAMPLE 4

An additive for use in asphalt emulsions was prepared having the following formula:

| | Percent |
|---|---|
| Sodium thiosulfate | 10 |
| Preservative | 1 |
| Guar gum | 89 |

This composition was used as a thickening additive for asphalt emulsions. The emulsions thickened with this additive maintained desired viscosity after being held at 150–200° F. for as long as one week. Asphalt emulsions thickened with a similar composition without sodium thiosulfate became thin within a short period of time under these temperature conditions.

EXAMPLE 5

The effectiveness of various salts in promoting the heat stability of solutions of guar gum in both tap water and brine solutions was investigated. Each of the solutions contained 0.9% of guar gum and 0.1% of the salt. The guar gum and salt were added to the solutions and the samples were allowed to hydrate for two hours at 77° F. At this point, the pH and viscosity of the solution were determined. The viscosity was determined using a Brookfield viscosimeter operated at 20 r.p.m. The samples were then aged statically in an oven at 150° F. Representative samples were removed periodically, cooled to 77° F. and again evaluated with respect to their pH

We claim:
1. A colloidal aqueous solution of galactomannan materials having a decreased rate of degradation at elevated temperatures comprising water, a galactomannan in an amount sufficient to increase the viscosity of the solution and a salt from the group consisting of water-soluble metal sulfites, thiosulfates and arsenites which is effective in retarding degradation of the galactomannan material in the presence of water at elevated temperatures, said solution having a pH of from about 5.5 to about 10, the salt being present in an amount sufficient to decrease the rate of degradation of the gum at elevated temperatures.

2. A composition for use in preparing a colloidal aqueous solution of improved stability at elevated temperatures comprising a galactomannan, and a salt from the group consisting of water-soluble metal sulfites, thiosulfates and arsenites which is effective in retarding degradation of the galactomannan material in the presence of water at elevated temperatures, the salt being present in an amount sufficient to decrease the rate of degradation of the galactomannan at elevated temperatures in the presence of water.

3. A colloidal aqueous solution of tara gum having a decreased rate of degradation at elevated temperatures comprising water, tara gum in an amount sufficient to increase the viscosity of the solution and at least 2.5% by weight of the gum of sodium sulfite, the solution having a pH of from about 5.5 to about 10.

4. A composition for use in preparing a colloidal aqueous solution of improved stability at elevated temperatures comprising tara gum and at least 2.5% by weight of the gum of sodium sulfite.

5. A colloidal aqueous solution of tara gum having a decreased rate of degradation at elevated temperatures comprising water, tara gum in an amount sufficient to increase the viscosity of the solution, an effective amount of sodium chloride, and at least 2.5% by weight of the gum of sodium sulfite, the solution having a pH of from about 5.5 to about 10.

6. A colloidal aqueous solution of tara gum having a decreased rate of degradation at elevated temperatures comprising water, tara gum in an amount sufficient to increase the viscosity of the solution, at least 5% by weight of the gum of sodium thiosulfate and a salt selected from the group consisting of disodium phosphate, trisodium phosphate and sodium tripolyphosphate, the salt from said group being present in an amount sufficient to increase the initial viscosity of the solution, the solution having a pH of from about 5.5 to about 10.

7. A composition for use in preparing a colloidal aqueous solution of improved stability at elevated temperatures comprising tara gum, at least 5% by weight of the gum of sodium thiosulfate and a salt selected from the group consisting of disodium phosphate, trisodium phosphate and sodium tripolyphosphate, the salt from said group being present in an amount sufficient to increase initial solution viscosity when the composition is added to water.

8. A colloidal aqueous solution of locust bean gum having a decreased rate of degradation at elevated temperatures comprising water, locust bean gum in an amount sufficient to increase the viscosity of the solution, an effective amount of sodium chloride, and at least 2.5% by weight of the gum of sodium sulfite, the solution having a pH of from about 5.5 to about 10.

9. A composition for use in preparing an aqueous solution of improved stability at elevated temperatures comprising locust bean gum, an effective amount of sodium chloride, and at least 2.5% by weight of the gum of sodium sulfite.

10. A colloidal aqueous solution of locust bean gum having a decreased rate of degradation at elevated temperatures comprising water, locust bean gum in an amount sufficient to increase the viscosity of the solution and at least 5% by weight of the gum of sodium thiosulfate, the solution having a pH of from about 5.5 to about 10.

11. A colloidal aqueous solution of locust bean gum having a decreased rate of degradation at elevated temperatures comprising water, locust bean gum in an amount sufficient to increase the viscosity of the solution, sodium chloride, and at least 5% by weight of the gum of sodium thiosulfate, the solution having a pH of from about 5.5 to about 10.

12. A colloidal aqueous solution of locust bean gum having a decreased rate of degradation at elevated temperatures comprising water, locust bean gum in an amount sufficient to increase the viscosity of the solution, sodium chloride, at least 5% by weight of the gum of sodium thiosulfate and a salt from the group consisting of disodium phosphate, trisodium phosphate and sodium tripolyphosphate, the salt from said group being present in an amount sufficient to increase the initial viscosity of the solution.

13. A colloidal aqueous solution of guar gum having a decreased rate of degradation at elevated temperatures comprising water, guar gum in an amount sufficient to increase the viscosity of the solution, sodium chloride, at least 2.5% by weight of the gum of sodium sulfite, the solution having a pH of from about 5.5 to about 10.

14. A composition for use in preparing a colloidal aqueous solution of improved stability at elevated temperatures comprising guar gum, an effective amount of sodium chloride and at least 2.5% by weight of the gum of sodium sulfite.

15. A colloidal aqueous solution of guar gum having a decreased rate of degradation at elevated temperatures comprising water, guar gum in an amount sufficient to increase the viscosity of the solution, sodium chloride, at least 2.5% by weight of the gum of sodium sulfite and a salt from the group consisting of disodium phosphate, trisodium phosphate and sodium tripolyphosphate, the salt from said group being in an amount sufficient to increase the initial solution viscosity when the composition is added to water, the solution having a pH of from about 5.5 to about 10.

16. A composition for use in preparing a colloidal aqueous solution of improved stability at elevated temperatures comprising guar gum, an effective amount of sodium chloride, at least 2.5% by weight of the gum of sodium sulfite, and a salt from the group consisting of disodium phosphate, trisodium phosphate and sodium tripolyphosphate, the salt from said group being present in an amount sufficient to increase the initial solution viscosity when the composition is added to water.

17. A colloidal aqueous solution of guar gum having a decreased rate of degradation at elevated temperatures comprising water, guar gum in an amount sufficient to increase the viscosity of the solution and at least 5% by weight of the gum of sodium thiosulfate.

18. A composition for use in preparing a colloidal aqueous solution of improved stability at elevated temperatures comprising guar gum, and at least 5% by weight of the gum of sodium triosulfate and a preservative.

19. A colloidal aqueous solution of guar gum comprising water, guar gum in an amount sufficient to increase the viscosity of the solution, sodium chloride, and at least 5% by weight of the gum of sodium thiosulfate, the solution having a pH of from amout 5.5 to about 10.

20. A colloidal aqueous solution of guar gum having a decreased rate of degradation at elevated temperatures comprising water, guar gum in an amount sufficient to increase the viscosity of the solution, an effective amount of sodium chloride, at least 5% by weight of the gum of sodium thiosulfate, and a salt from the group consisting of disodium phosphate, trisodium phosphate and sodium tripolyphosphate, the salt from said group being present in an amount sufficient to increase the initial viscosity of the solution.

21. A colloidal aqueous solution of guar gum having a decreased rate of degradation at elevated temperatures comprising water, guar gum in an amount sufficient to increase the viscosity of the solution, an effective amount of sodium chloride, and amounts of sodium arsenite sufficient to decrease the rate of degradation of the gum at elevated temperatures in the presence of water.

22. A colloidal aqueous solution of guar gum having a decreased rate of degradation at elevated temperatures comprising water, guar gum in an amount sufficient to increase the viscosity of the solution, an effective amount of sodium chloride, and at least 10% by weight of the gum of zinc sulfite.

23. An oil well drilling fluid comprising a galactomannan gum in an amount sufficient to increase the viscosity of the solution and a salt from the group consisting of water-soluble metal sulfites, thiosulfites and arsenites, the fluid having a pH of from about 5.5 to about 10, the salt being present in an amount sufficient to decrease the rate of degradation of the galactomannan at elevated temperatures in the presence of water.

24. An oil well drilling fluid additive comprising guar gum and at least about 5% by weight of the gum of sodium thiosulfae.

25. An asphalt emulsion including, as a thickening agent, a mixture of guar gum, sodium thiosulfate and a guar gum preservative, the sodium thiosulfate being present at a level of at least 5% by weight of the gum.

26. The process of retarding the degradation of a galactomannan material in the presence of water at elevated temperatures comprising the addition to a colloidal aqueous solution of said material, of a salt from the group consisting of water-soluble metal sulfites, thiosulfates and arsenites which is effective in retarding degradation of the galactomannan material in the presence of water at elevated temperatures and adjusting the pH of said solution to from about 5.5 to about 10, the salt being present in an amount sufficient to decrease the rate of degradation of the galactomannan at elevated temperatures in the presence of water.

References Cited in the file of this patent

UNITED STATES PATENTS

| | | |
|---|---|---|
| 2,073,616 | Acree | Mar. 16, 1937 |
| 2,463,554 | Osinski et al. | Mar. 8, 1949 |
| 2,658,036 | Core et al. | Nov. 3, 1953 |
| 2,696,912 | Atwood et al. | Dec. 14, 1954 |
| 3,007,879 | Jordan | Nov. 7, 1961 |

OTHER REFERENCES

Paper Trade Journal, December 20, 1945, pp. 38, 40.

UNITED STATES PATENT OFFICE
CERTIFICATE OF CORRECTION

Patent No. 3,146,200                          August 25, 1964

Arthur M. Goldstein et al.

It is hereby certified that error appears in the above numbered patent requiring correction and that the said Letters Patent should read as corrected below.

Columns 5 and 6, Table 2, column (4), under the heading "Visc" and opposite "Time (days): 2", for "1,180" read -- 2,180 --; same columns, same table, column (5), line 3 thereof, strike out "4"; same columns 5 and 6, Table 3, column (6), under the heading "pH", opposite "Time (days): 6", for ".89" read -- 8.9 --; column 6, Table 4, column (2), under the heading "Visc.", opposite "Time (days): 11", for "1,160" read -- 2,160 --; column 12, line 19, for "triosulfate" read -- thiosulfate --; line 24, for "amount" read -- about --; same column 12, line 61, for "thiosulfae" read -- thiosulfate --.

Signed and sealed this 29th day of December 1964.

(SEAL)
Attest:

ERNEST W. SWIDER  
Attesting Officer

EDWARD J. BRENNER  
Commissioner of Patents